US012359644B2

(12) United States Patent
Zhang et al.

(10) Patent No.: US 12,359,644 B2
(45) Date of Patent: Jul. 15, 2025

(54) NON-ROAD ENGINE

(71) Applicant: CHONGQING ZONGSHEN GENERAL POWER MACHINE CO., LTD., Chongqing (CN)

(72) Inventors: Yi Zhang, Chongqing (CN); Bin Yuan, Chongqing (CN); Yichao Wang, Chongqing (CN); Rong Luo, Chongqing (CN); Baiwan Luo, Chongqing (CN)

(73) Assignee: CHONGQING ZONGSHEN GENERAL POWER MACHINE CO., LTD., Chongqing (CN)

(*) Notice: Subject to any disclaimer, the term of this patent is extended or adjusted under 35 U.S.C. 154(b) by 0 days.

(21) Appl. No.: 18/398,280

(22) Filed: Dec. 28, 2023

(65) Prior Publication Data

US 2025/0035072 A1 Jan. 30, 2025

(30) Foreign Application Priority Data

Jul. 28, 2023 (CN) ......................... 202310941010.4

(51) Int. Cl.

| | |
|---|---|
| ***F02M 5/08*** | (2006.01) |
| ***F02M 7/22*** | (2006.01) |
| ***F02M 17/04*** | (2006.01) |
| ***F02M 37/00*** | (2006.01) |

(52) U.S. Cl.

CPC .............. *F02M 17/04* (2013.01); *F02M 7/22* (2013.01); *F02M 37/0023* (2013.01)

(58) Field of Classification Search

CPC ........ F02M 1/00; F02M 17/04; F02M 35/022; F02M 35/0226; F02M 35/0223; F02M 1/04; F02M 1/043; F02M 1/046; F02M 1/06; F02M 19/00

See application file for complete search history.

(56) References Cited

U.S. PATENT DOCUMENTS 3,741,188 A * 6/1973 Rickey ...................... F02M 3/08 123/DIG. 11

6,866,019 B1 * 3/2005 Schmitz ................. F02M 7/133 123/344

FOREIGN PATENT DOCUMENTS

| | | | |
|---|---|---|---|
| CN | 213205855 U | * | 5/2021 |
| CN | 213807887 U | * | 7/2021 |
| CN | 215860542 U | * | 2/2022 |
| FR | 2551134 A1 | * | 3/1985 |

(Continued)

OTHER PUBLICATIONS

JPS6338673A—English Translation (Year: 1988).*

*Primary Examiner* — Lindsay M Low

*Assistant Examiner* — Teuta B Holbrook

(74) *Attorney, Agent, or Firm* — Bayramoglu Law Offices LLC

(57) ABSTRACT

A non-road engine is provided. The non-road engine includes a carburetor and a combination switch for controlling on-off of a fuel supply pipe between a fuel tank and the carburetor, where the carburetor is provided with a control valve for controlling opening and closing of a main jet; the control valve is linked and matched with the combination switch; when the combination switch is in an on state, the control valve causes the main jet to be in an open state; and when the combination switch is in an off state, the control valve causes the main jet to be in a closed state.

11 Claims, 5 Drawing Sheets

(56) References Cited

FOREIGN PATENT DOCUMENTS

| | | | | |
|---|---|---|---|---|
| JP | S633867 | A | * | 2/1988 |
| KR | 950011332 | B1 | * | 9/1995 |

* cited by examiner

NON-ROAD ENGINE

CROSS REFERENCE TO THE RELATED APPLICATIONS

This application is based upon and claims priority to Chinese Patent Application No. 202310941010.4, filed on Jul. 28, 2023, the entire contents of which are incorporated herein by reference.

TECHNICAL FIELD

The present disclosure relates to a non-road engine.

BACKGROUND

Non-road engines are engines not used in motor vehicles, for example, engines used in power generation equipment such as generators, and engines used in garden equipment such as lawn mowers. In some regions, non-road engines are required to comply with independent environmental standards, especially strict requirements for tip-over fuel leakage and evaporative emissions. The existing non-road engine includes a carburetor, a fuel tank, an air filter, an engine block, a crankcase, and various connecting pipes. Because previous environmental standards focused on fuel leakage from the fuel tank of the engine tipping over, the prior art focuses on improvements in the prevention of fuel leakage from the fuel tank. Nowadays, the environmental protection standards are tightened up, and regulations have been made on fuel leakage in case the non-road engine tips over during shutdown. Therefore, reducing the risk of fuel leakage from non-road engines tipping over during shutdown has become an urgent technical issue to be addressed.

SUMMARY

An objective of the present disclosure is to provide a non-road engine to address the risk of fuel leakage from non-road engines tipping over in the prior art.

In order to achieve the above objective, a basic solution of the present disclosure provides a non-road engine. The non-road engine includes a carburetor and a combination switch for controlling on-off of a fuel supply pipe between a fuel tank and the carburetor, where the carburetor is provided with a control valve for controlling opening and closing of a main jet; the control valve is linked and matched with the combination switch; when the combination switch is in an on state, the control valve causes the main jet to be in an open state; and when the combination switch is in an off state, the control valve causes the main jet to be in a closed state.

This basic solution has the following beneficial effects. With this design, when the combination switch is turned on, the control valve opens the main jet of the carburetor, allowing the non-road engine to operate normally. When the non-road engine is shut down, the combination switch is turned off in a linked manner. The combination switch cuts off the fuel supply between the fuel tank and the carburetor in a linked manner. Meanwhile, the control valve controls the main jet of the carburetor to be closed, preventing the fuel in the carburetor from being discharged through the main jet. In this way, when the non-road engine tips over, the fuel in the carburetor will not be discharged from the main jet into an intake pipe of the non-road engine to cause fuel leakage. Since the fuel supply between the fuel tank and the carburetor is cut off, even if the control valve fails, the fuel in the fuel tank will not leak through the fuel circuit between the fuel tank and the carburetor. The design avoids fuel leakage after the non-road engine tips over, thereby meeting the environmental requirements for tip-over fuel leakage. In addition, the design can reduce evaporative emissions of the non-road engine, ensuring that the evaporative emissions performance of the non-road engine meets environmental requirements.

Preferably, the control valve and the combination switch are mechanically linked and matched. This design reduces the impact of factors such as engine heat on the linkage between the control valve and the combination switch, thereby improving the reliability of linkage and matching.

Preferably, the control valve includes a needle valve stem matched with an end of the main jet; the combination switch is provided with a movable part for controlling the on-off of the combination switch; and the movable part is linked and matched with the needle valve stem through a cable. This design achieves the linkage between the combination switch and the control valve through the cable, and reduces interference from other components of the non-road engine on the linkage between the combination switch and the control valve, thereby facilitating assembly.

Preferably, the control valve is provided with a return spring that causes the needle valve stem to maintain a trend of closing the main jet. With this design, when the needle valve stem is not subjected to the pulling force of the cable, the main jet is closed by the return spring, which facilitates the closing operation of the main jet.

Preferably, an elastic seal is provided between the needle valve stem and a fuel storage chamber of the carburetor. This design avoids fuel leakage at the needle valve stem.

Preferably, the elastic seal is in a circular shape, with a cross-section in a shape of an arc-shaped groove; and when the needle valve stem closes the main jet, the elastic seal is in a normal shape or normal state. This design keeps the elastic seal in a non-stressed state during engine shutdown, thereby extending the service life of the elastic seal.

Preferably, the control valve is an electronically controlled valve; and the combination switch is provided with a circuit switch electrically connected to the control valve. This design simplifies the linkage between the combination switch and the control valve, further reducing interference from other components.

Preferably, the control valve includes a solenoid valve for controlling movement of the needle valve stem; and the circuit switch is electrically connected to the solenoid valve. This design further simplifies the structure by controlling the movement of the needle valve stem through the circuit switch and the solenoid valve.

Preferably, the carburetor is provided with a bowl vent; and the bowl vent is an external bowl vent with an opening facing towards an upper part of the carburetor. This design reduces the amount of fuel discharged through the bowl vent when the non-road engine tips over, further reducing the evaporative emissions of the non-road engine.

This solution has the following beneficial effects. When the non-road engine is shut down, the combination switch cuts off the fuel supply between the fuel tank and the carburetor and closes the main jet of the carburetor, significantly reducing the risk of fuel leakage after the non-road engine tips over.

DETAILED DESCRIPTION OF THE EMBODIMENTS

Figure 1:
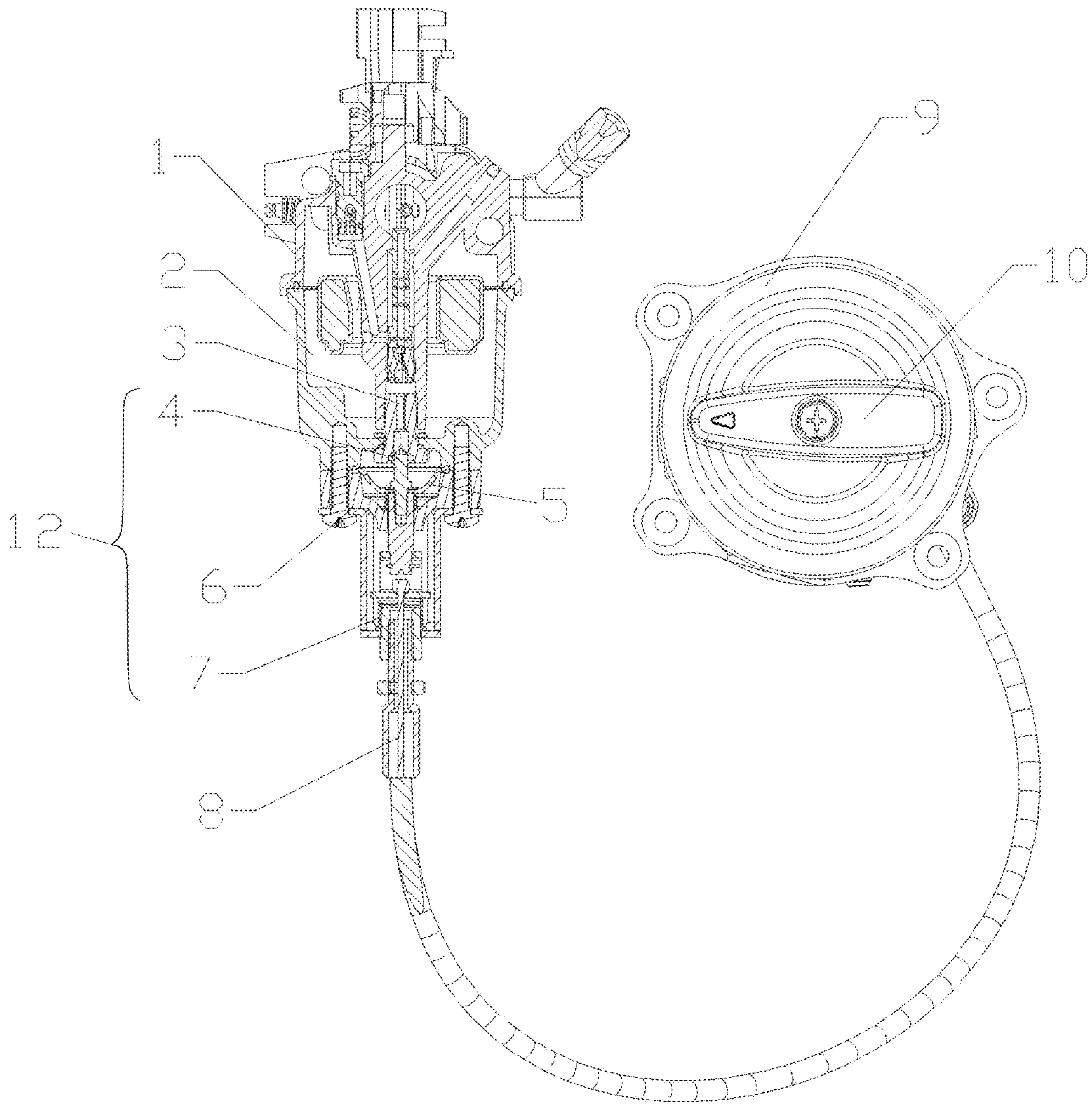
FIG. 1 is a schematic diagram of a non-road engine according to an embodiment of the present disclosure, where a combination switch and a carburetor are matched with each other and the combination switch is in an on state.
Figure 2:
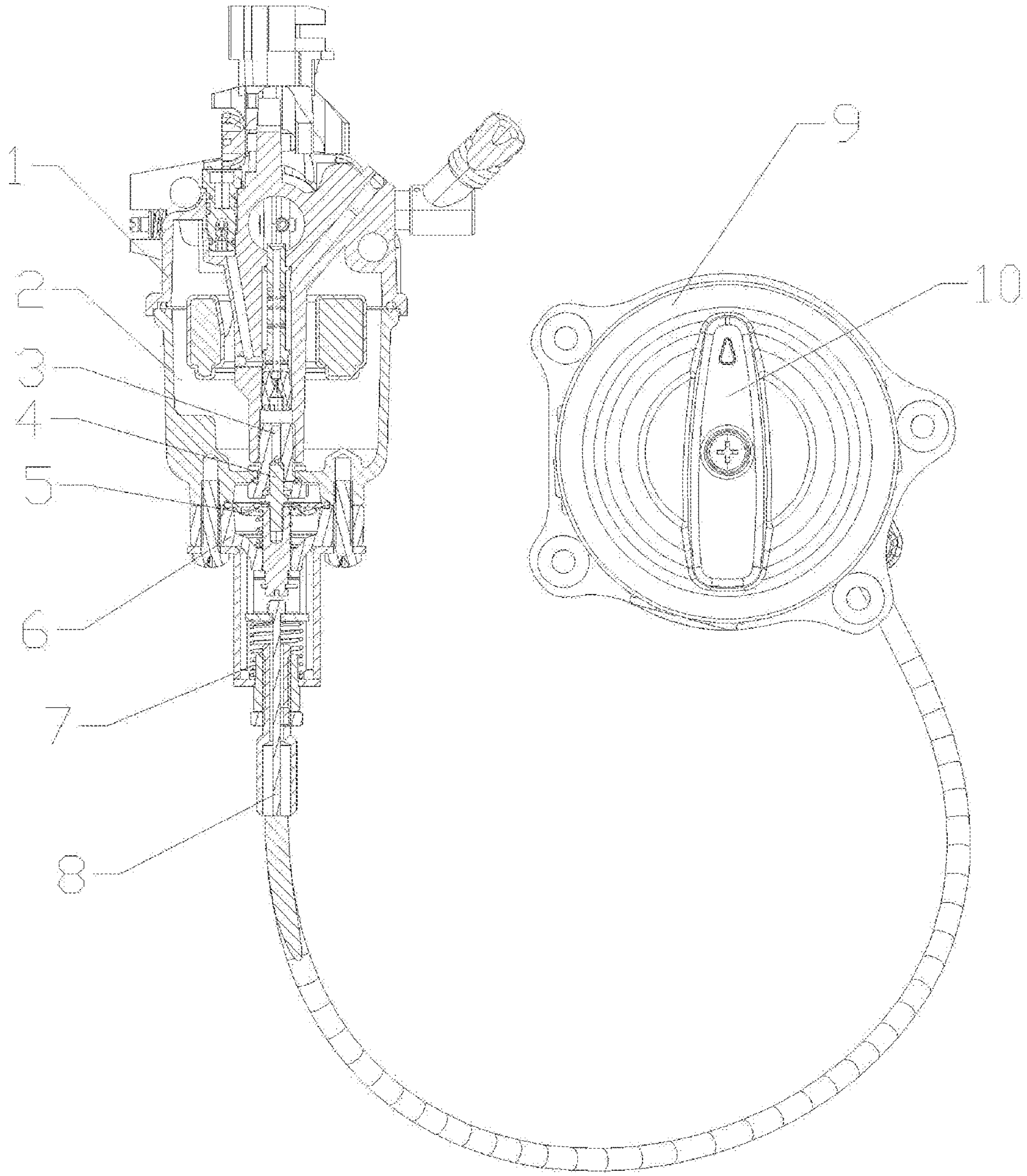
FIG. 2 is a schematic diagram of the combination switch (FIG. 1) in an off state.
Figure 3:
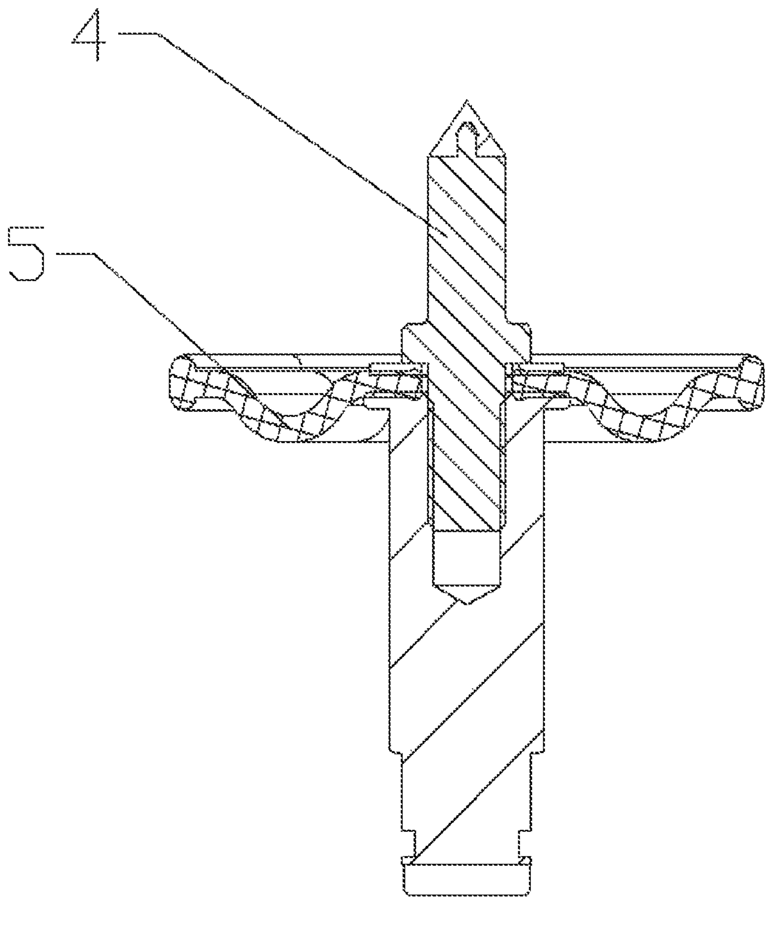
FIG. 3 is a schematic diagram of a needle valve stem and an elastic seal (shown in FIG. 1) that are matched with each other.
Figure 4:
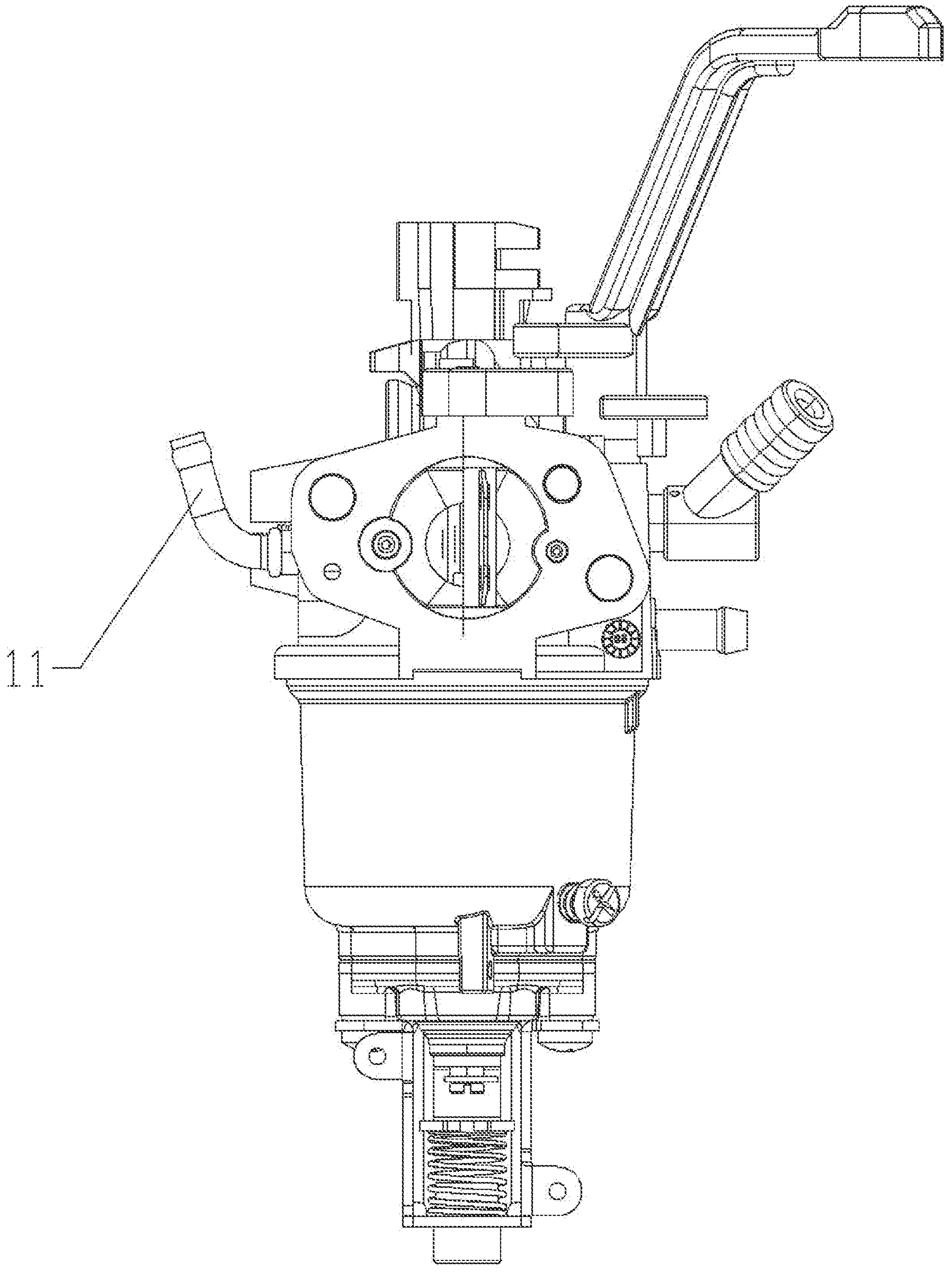
FIG. 4 is a schematic diagram of a bowl vent according to the present disclosure.

In the present disclosure, a normal shape or normal state refers to a shape or state of an elastic seal in a non-stressed state.

The present disclosure is described in more detail below with reference to the specific implementations.

Reference signs in the drawings of the specification include: 1. carburetor; 2. fuel storage chamber; 3. main jet; 4. needle valve stem; 5. elastic seal; 6. valve body shell; 7. return spring; 8. cable; 9. combination switch; 10. movable part; 11. bowl vent; 12. control valve; 13. solenoid valve; 14. circuit switch; and 15 electronically controlled valve.

An embodiment of the present disclosure provides a non-road engine. As shown in FIGS. 1 to 4, the non-road engine includes carburetor 1 and combination switch 9 for controlling on-off of a fuel supply pipe between a fuel tank and the carburetor. The carburetor 1 is provided with a control valve 12 for controlling opening and closing of main jet 3. The control valve is linked and matched with the combination switch 9. When the combination switch 9 is in an on state, the control valve causes the main jet 3 to be in an open state. When the combination switch 9 is in an off state, the control valve causes the main jet 3 to be in a closed state. Specifically, the control valve 12 includes valve body shell 6. The valve body shell 6 is fixedly connected to the carburetor 1 through a bolt. The control valve 12 includes needle valve stem 4 matched with an end of the main jet 3 of the carburetor 1. The needle valve stem 4 is slidably supported by the valve body shell 6, such that the needle valve stem and the end of the main jet 3 are switched between a combined state and a separated state, thereby achieving the closing and opening of the main jet 3. The control valve 12 is provided with return spring 7 that causes the needle valve stem 4 to maintain a trend of closing the main jet 3.

In this embodiment, the control valve and the combination switch 9 are mechanically linked and matched. Specifically, an end of the needle valve stem 4 is provided with a pull buckle. The pull buckle is connected to cable 8. The cable 8 is pulled to move the needle valve stem 4. In this embodiment, the structure of the cable 8 is similar to the structure of a clutch line in the prior art. The cable includes a steel wire and a wire sleeve that is slidably sleeved outside of the steel wire. The combination switch 9 is provided with movable part 10 for controlling the on-off of the combination switch. The movable part 10 is connected to the cable 8 to achieve pulling control of the cable 8. In this embodiment, the combination switch 9 is a rotary switch, and the movable part 10 is a knob for controlling the on-off of the combination switch. The knob is connected to the cable 8, thereby achieving the pulling operation of the cable 8 through the rotation of the knob.

In order to avoid fuel leakage from the needle valve stem 4, elastic seal 5 is provided between the needle valve stem 4 and fuel storage chamber 2 of the carburetor 1. In this embodiment, the elastic seal 5 is in a circular shape, and a cross-section of the elastic seal 5 is in a shape of an arc-shaped groove. The elastic seal 5 includes an inner edge connected to the needle valve stem 4 in a sealed manner and an outer edge connected between the fuel storage chamber 2 of the carburetor 1 and the valve body shell 6 of the control valve. In this embodiment, the fuel storage chamber 2 is formed by a fuel cup provided at a bottom of the carburetor 1. When the needle valve stem 4 closes the main jet 3, the elastic seal 5 is in a normal shape or normal state to extend the service life of the elastic seal 5. The carburetor 1 is provided with bowl vent 11. The bowl vent 11 is external bowl vent, which faces towards an upper part of the carburetor 1 to keep an opening of the bowl vent 11 away from a ground.

A specific implementation process is as follows. When it is necessary to start the non-road engine, the knob of the combination switch 9 is rotated to turn on the combination switch 9. Meanwhile, the cable 8 pulls the needle valve stem 4 of the control valve to move away from the main jet 3, causing the needle valve stem 4 to open the main jet 3 of the carburetor 1. In this way, fuel can be fed into the carburetor cup and the main jet 3 normally. When it is necessary to shut down the non-road engine, the knob of the combination switch 9 is rotated to turn off the combination switch 9. Meanwhile, a pulling force on the cable 8 is gradually removed, such that the needle valve stem 4 of the control valve moves towards the main jet 3 under the action of the return spring 7. Finally, the needle valve stem 4 blocks the end of the main jet 3, causing the main jet 3 to close. In this way, if the non-road engine tips over, the fuel in the carburetor will not be discharged from the main jet into an intake pipe of the non-road engine to cause fuel leakage. This solution significantly reduces the evaporative emissions of the non-road engine. In practical use, the combination switch can also integrate an engine shutdown control function, allowing the combination switch to be used to control the shutdown of the non-road engine and cut off the fuel supply between the fuel tank and the carburetor.

Figure 5:
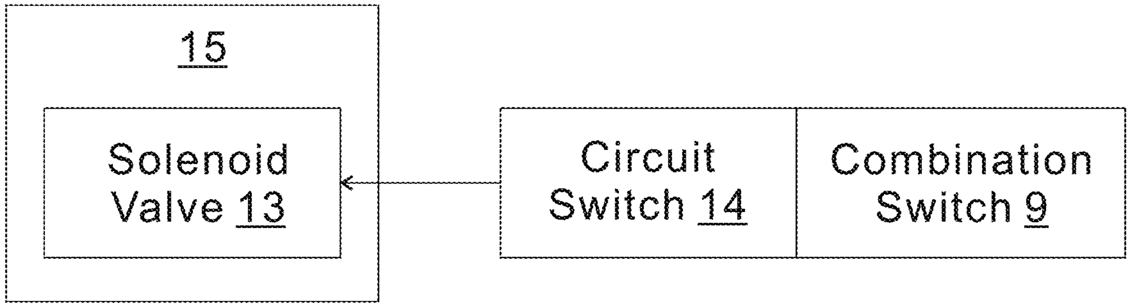
FIG. 5 is a block diagram illustrating an alternative implementation of a control valve.

In other implementations, as illustrated in FIG. 5, the control valve is an electronically controlled valve 15, and the combination switch 9 is provided with a circuit switch 14 electrically connected to the control valve. Specifically, the control valve includes a solenoid valve 13 for controlling the movement of the needle valve stem 4, and the circuit switch 14 is electrically connected to the solenoid valve. By rotating the knob of the combination switch 9, the on-off of the circuit switch can be controlled, thereby achieving control of the solenoid valve.

The above described is only an embodiment of the present disclosure, and common knowledge such as specific structures and characteristics known in the art is not described here too much. It should be noted that those skilled in the art may further make several variations and improvements without departing from the scope of the present disclosure, but such variations and improvements should also be deemed as falling within the protection scope of the present disclosure without affecting the implementation effect and practicability of the patent.

What is claimed is:

1. A non-road engine, comprising a carburetor and a combination switch for controlling on-off of a fuel supply to the carburetor, wherein the carburetor is provided with a bowl vent; and the bowl vent is an external bowl vent with an opening, wherein the opening faces towards an upper part of the carburetor, wherein the carburetor is provided with a control valve for controlling opening and closing of a main jet; the control valve is linked and matched with the combination switch; when the combination switch is in an on state, the control valve causes the main jet to be in an open state; and when the combination switch is in an off state, the control valve causes the main jet to be in a closed state, wherein the main jet is closed by the control valve when the non-road engine is shut down.

2. The non-road engine according to claim 1, wherein the control valve and the combination switch are mechanically linked and matched.

3. The non-road engine according to claim 2, wherein the control valve comprises a needle valve stem matched with an end of the main jet; the combination switch is provided with a movable part for controlling the on-off of the combination switch; and the movable part is linked and matched with the needle valve stem through a cable.

4. The non-road engine according to claim 3, wherein the control valve is provided with a return spring, the return spring causes the needle valve stem to maintain a trend of closing the main jet.

5. The non-road engine according to claim 4, wherein an elastic seal is provided between the needle valve stem and a fuel storage chamber of the carburetor.

6. The non-road engine according to claim 5, wherein the elastic seal is in a circular shape, with a cross-section in a shape of an arc-shaped groove; and when the needle valve stem closes the main jet, the elastic seal is in a normal shape or normal state.

7. The non-road engine according to claim 3, wherein an elastic seal is provided between the needle valve stem and a fuel storage chamber of the carburetor.

8. The non-road engine according to claim 7, wherein the elastic seal is in a circular shape, with a cross-section in a shape of an arc-shaped groove; and when the needle valve stem closes the main jet, the elastic seal is in a normal shape or normal state.

9. The non-road engine according to claim 1, wherein the control valve is an electronically controlled valve; and the combination switch is provided with a circuit switch, wherein the circuit switch is electrically connected to the control valve.

10. The non-road engine according to claim 9, wherein the control valve comprises a solenoid valve for controlling movement of a needle valve stem; and the circuit switch is electrically connected to the solenoid valve.

11. The non-road engine according to claim 1, wherein the combination switch controls operation of the control valve through movement of a cable.

* * * * *